United States Patent [19]
Sato et al.

[11] 3,922,042
[45] Nov. 25, 1975

[54] THRUST BEARING DEVICE
[75] Inventors: Hiroshi Sato; Yosio Furukawa; Koji Ozawa, all of Hitachi, Japan
[73] Assignee: Hitachi, Ltd., Japan
[22] Filed: Mar. 18, 1974
[21] Appl. No.: 452,280

[30] Foreign Application Priority Data
　Mar. 19, 1973　Japan.............................. 48-31025

[52] U.S. Cl............................... 308/160; 308/168
[51] Int. Cl.².......................................... F16C 17/06
[58] Field of Search..................... 308/160, 168, 172

[56] References Cited
UNITED STATES PATENTS
| 3,271,088 | 9/1966 | Latham et al...................... | 308/160 |
| 3,501,206 | 3/1970 | Lehoczky........................... | 308/160 |

Primary Examiner—M. Henson Wood, Jr.
Assistant Examiner—Michael Mar
Attorney, Agent, or Firm—Craig & Antonelli

[57] ABSTRACT

A thrust bearing device for use in a water power generating apparatus, for reducing friction loss in the outer periphery of a bearing collar due to the fact that the bearing collar mounted on the rotary member slidingly rotates along the annular surface of a bearing shoe in lubricating oil, a fixed oil seal cover is provided to cover the outer periphery of the bearing collar in spaced relation thereto in a manner to define a space or chamber between the oil seal cover and the outer periphery of the bearing collar, the oil seal cover being provided with seals for preventing ingress of lubricating oil into the chamber, whereby friction loss in the outer periphery of the bearing collar may be reduced.

4 Claims, 4 Drawing Figures

15

THRUST BEARING DEVICE

BACKGROUND OF THE INVENTION

This invention relates to improvements in a thrust bearing device for use in a water power generating apparatus or a vertical oil pump, and more particularly to improvements in a thrust bearing device, whose bearing collar extends to the interior of a lubricating oil tank so that a major part thereof may be submerged therein to a substantial extent, for example as in the arrangement wherein the bearing collar receives a thrust and is guided by a guide bearing.

As is well known, the construction of the thrust bearing device of the type is such that circular lubricating oil tank is arranged around a rotary shaft coaxially with but at a given spacing from said rotary shaft in a manner to encompass same therewith and a skirtshaped bearing collar, which is part of the rotary shaft, is submerged in the oil tank and adapted to rotate with its bottom face being slid on a surface of a segmented bearing shoe located in the neighborhood of the bottom of lubricating oil tank.

Needless to say, lubricating oil charge in the tank serves to smooth mutual sliding faces between the bottom face of bearing collar and the upper face of bearing shoe and at the same time serves to cool the relative sliding faces thereof. To this end, it suffices that lubricating oil be charged in the tank to such a level, at which the relative sliding faces between the bearing collar and the bearing shoe are submerged. However, in most cases, a guide bearing is positioned within the lubricating oil tank. In this case, the guide bearing is usually mounted on the outer periphery of a diametrically reduced upper portion of bearing collar, and the lubricating oil has to be fed to the guide bearing, such that a greater part of bearing collar will be submerged in lubricating oil. With the construction described, when the bearing collar is rotated with the rotary shaft, friction arises between the lubricating oil and the outer peripheral surface of bearing collar, resulting in the extremely large friction loss.

In case a rotary machine of a small capacity is used, the outer diameter of a bearing collar is relatively small and hence the circumferential speed thereof is low. Accordingly, friction loss is negligible. On the other hand, in case of a large scale of rotary machine such as a rotary machine for use in a water power generating machine or the like, for example, a rotary machine of 400 MVA class having a bearing collar of 2.5 m in outer diameter, the peripheral speed is 40 m/s, with the result of the friction loss equivalent to 2000 KW in the bearing portion. This means that unless the friction loss is present, the outputs in the generator will be increased by the value corresponding to such friction loss. Stated otherwise, there is added another generator having outputs of 2000 kw to the existing generator.

SUMMARY OF THE INVENTION

To avoid the drawbacks described, i.e friction loss along the outer periphery of a bearing collar due to the friction between the bearing portion and lubricating oil, it is an object of the present invention to provide a thrust bearing device, wherein friction loss along the outer periphery of a bearing collar due to the contact with lubricating oil is reduced to a greater extent, even for a high speed rotary machine or for a low speed rotary machine having a large bearing device whose peripheral speed is considerably high.

Another object of the present invention is to provide a thrust bearing device, wherein reduction in friction loss along the outer periphery of a bearing collar is achieved without the use of any special device or other power source, and which is simple in construction and reliable in its performance.

To attain those objects, in view of the fact that the rotary shaft receives a thrust, the present invention provides a thrust bearing device comprising a fixed oil seal cover mounted to cover the outer periphery of a bearing collar which extends in a manner to submerge same in lubricating oil in a lubricating oil tank, said oil seal cover surrounding a portion of said outer periphery which contacts the lubricating oil and being spaced apart from said outer periphery of bearing collar, thereby defining an air chamber therebetween, and said oil seal cover having an air intake port for communicating said air chamber with atmosphere outside the lubricating oil and an lubricating oil discharge port for discharging from said air chamber the lubricating oil dwelling therein, and thus lubricating oil in the air chamber will be forced out therefrom by lubricating oil discharge means such as a pump, thereby maintaining said air chamber empty.

DETAILED DESCRIPTION OF THE INVENTION

The description will hereunder to given to embodiments in conjunction with the accompanying drawings.

Figure 1:
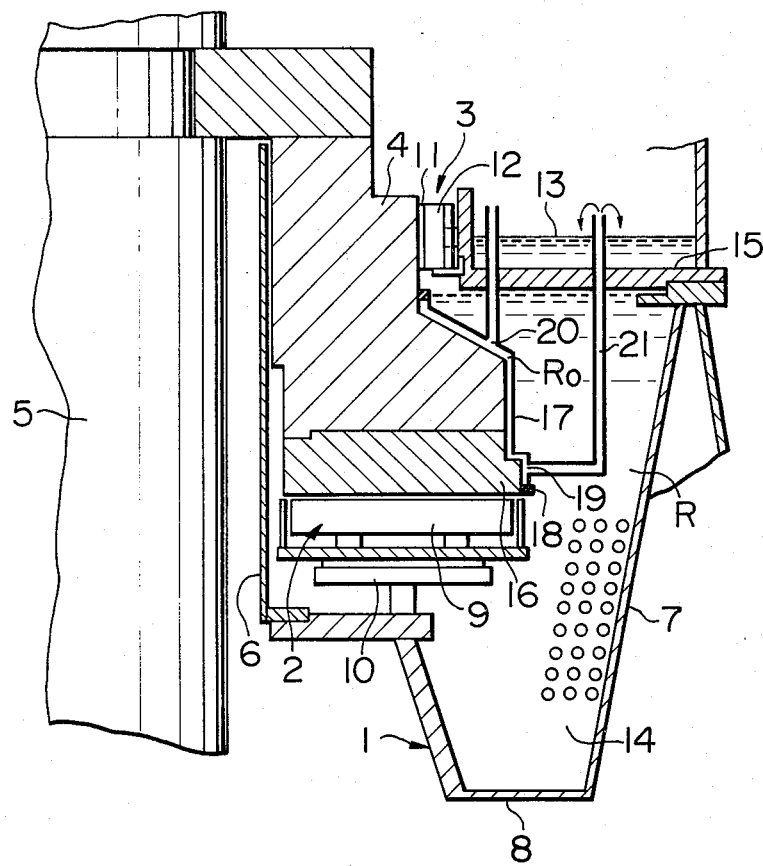
FIG. 1 is a longitudinal side elevational view illustrating an essential part of a rotary machine equipped with a thrust bearing device according to the present invention.

FIG. 1 shows in cross section a bearing device used in a water power generating machine and the neighborhood thereof. The bearing device is essentially composed of a lubricating oil tank 1, a thrust bearing 2 and a guide bearing 3, which bearing device is mounted on a rotary shaft 5 having a bearing collar 4. The lubricating oil tank 1 is of a circular shape consisting of a diametrically inner wall 6, a diametrically outer wall and a bottom plate 8, thereby defining a circular oil chamber R around the rotary shaft. Within the lubricating oil chamber R filled with lubricating oil 13, there are housed the thrust bearing 2, guide bearing 3, and a lubricating oil cooler 14 for cooling the lubricating oil 13 charged in the tank. The thrust bearing 2 is composed of a support construction 10 fixedly mounted on the bottom plate 8 of lubricating oil tank and a thrust bearing shoe 9, said thrust bearing shoe resting on the support construction 10 in rockable relation.

The guide bearing 3 is composed of a support construction 12 and a guide bearing shoe 11 carried by said support construction in rockable relation, said support construction being rigidly mounted on a support arm 15 projecting from the outer periphery of lubricating oil tank to extend to the interior of lubricating oil tank. The bearing collar 4 mounted on the rotary shaft is located in the lubricating oil tank, in a manner to be slidable with respect to the thrust bearing shoe 9 and the guide bearing shoe 11.

The bearing collar 4 has the upper portion fixedly mounted on the rotary shaft 5 and a runner 16 contacting the bottom face of lower portion thereof, such that a thrust applied by the rotary shaft will be borne by way of the runner on the bearing collar.

The support for preventing the oscillation in rotary shaft is achieved by the guide bearing 3 in the outer periphery of the upper portion of bearing collar.

The bearing collar 4 is guided by the guide on the outer periphery of the upper portion thereof and bears a thurst on the bottom face of the lower portion thereof, and an oil seal cover 17 is provided around the outer periphery of bearing collar 4 at a given spacing therefrom, said oil seal cover extending from said upper portion of bearing collar to said lower portion thereof. The oil seal cover 17 provided around the bearing collar 4 is spaced apart by a distance for example of 20 to 25 mm from the outer periphery of bearing collar in consideration of the oscillation in rotor or the bounce thereof, thereby defining an air chamber Ro therebetween. The spacing should be preferably confined as narrow as possible for the reasons to be described later. The oil seal cover should be preferably extended to cover an entire portion of the outer periphery of bearing collar 4, precluding the relative sliding portions between the bearing collar and other members.

The oil seal cover 17 is made of an oil nonpermeable material such as an iron plate and has oil seal means 18 disposed in the lower end in the longitudinal axial direction thereof and between the outer periphery of bearing collar 4 and the cover. The oil seal cover 17 is provided with a lubricating oil discharge port 19 in the lower portion thereof, an air intake port 20 in the upper portion thereof, said lubricating oil discharge port serving to discharge from the air chamber lubricating oil introduced therein from said oil seal portion. The air intake port 20 is provided for filling air in the air chamber Ro. It is advantageous that the air intake port be provided in the possibly uppermost portion of the cover 17. The position of the air intake port, however, may be adjacent to the lubricating oil discharge port 19 so far as such an air intake port functions to fill air in the air chamber with ease. The reason why the lubricating oil discharge port 19 is provided in the lower portion of the cover is that the bearing collar 4, in general, is diametrically enlarged in the lower portion and high in the circumferential speed therein, and the lubricating oil tends to well in the lower portion due to its own weight. Thus, the lubricating oil discharge port is provided in the lower portion of the oil seal cover in the embodiment of FIG. 1. If the bearing collar has a diametrically enlarged portion in its upper portion or mid portion, in other words, in case the centrifugal force is severely applied to the lubricating oil in the upper portion of the bearing collar or in the mid portion thereof, the lubricating oil discharge port 19 should be provided in an upper portion or mid portion of the oil seal cover. In brief, the lubricating oil discharging action, i.e. a pumping action, is effected in the diametrically enlarged portion of bearing collar 4, and hence the lubricating oil discharge port should be provided in a portion where such a pumping action is effected.

The lubricating oil discharge port 19 may have an opening leading to the lubricating oil within the oil tank. This, however, incurs bubbles in lubricating oil due to air discharge into the lubricating oil tank, and in addition, will cause ingress of the lubricating oil into the air chamber from the discharge port, resulting in a risk of lowering the pumping performance. For this reason, the lubricating oil discharge port 19 is so designed as to lead to the atmosphere above the liquid surface of lubricating oil by way of a discharge pipe 21.

In operation, when the bearing collar 4 is rotated with the rotary shaft 5, the lubricating oil introduced in the air chamber Ro defined between the bearing collar 4 and the oil seal cover 17 accommodates the rotation of the bearing collar 4 and is then discharged from said air chamber through the lubricating oil discharge port 19 by resorting to the centrifugal force. Thus, the air chamber Ro in turn is filled with air of a quantity corresponding to the quantity of lubricating oil discharge.

In this case, the lubricating oil will ingress though the oil seal means into the air chamber Ro. However, such lubricating oil will be almost discharged by the pumping action in the bearing collar, such that the air chamber Ro will be filled with air substantially. Thus, the outer periphery of bearing collar 4 encompassed with the oil seal cover 17 is maintained in contact with air, without contacting the lubricating oil of high viscosity, and hence friction loss is greatly reduced. Reduction in friction loss in the bearing device is obtained only by providing the oil seal cover 17 having the air intake port and lubricating oil discharge port, around the outer periphery of bearing collar 4, without the use of any special motor or device.

In the embodiment described, discarge of the lubricating oil from the air chamber Ro is effected by resorting to the pumping action in the diametrically enlarged portion of bearing collar 4. The lubricating oil discharge may be effected without resorting to the pumping action in the diametrically enlarged portion. In detail, there are provided, on the outer peripheral surface of bearing collar 4, means so designed that the centrifugal force is readily applied to the lubricating oil dwelling in the air chamber Ro, with the lubricating oil discharge port being provided in a portion corresponding to said means. Such means will provide the same result as in the former embodiment.

Figure 2:
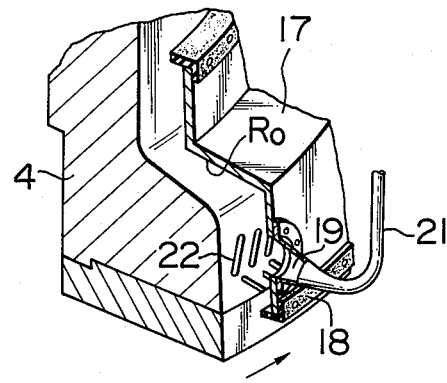
FIG. 2 is a sectional perspective view of a bearing collar of another embodiment.

An embodiment realizing the same is illustrated in FIG. 2, in which the bearing collar 4 and the oil seal cover 17 are shown in sectional perspective view. A plurality of slots 22 are provided obliquely on the outer peripheral surface of bearing collar 4 in a portion confronting the lubricating oil discharge port 19, so that the lubricating oil in the air chamber Ro is collected therein through rotation of the bearing collar in the direction of arrow. Owing to the oblique slots 22, the lubricating oil with be discharged from the air chamber Ro through the lubricating oil discharge port 19, without resorting to the pumping action in the diametrically enlarged portion of bearing collar.

Various means are employable for bringing about the same result, for example, the lubricating oil discharge port 19 is provided in a manner to project in the air chamber Ro, with its opening facing the rotating direction of the lubricating oil, thereby receiving the lubricating oil therein.

Those are the cases that the pumping action due to rotation of bearing collar is utilized for discharging from the air chamber Ro the lubricating oil dwelling therein into the outside. As an alternative, a pump may be provided separately for the purpose of discharging the lubricating oil.

Figure 3:
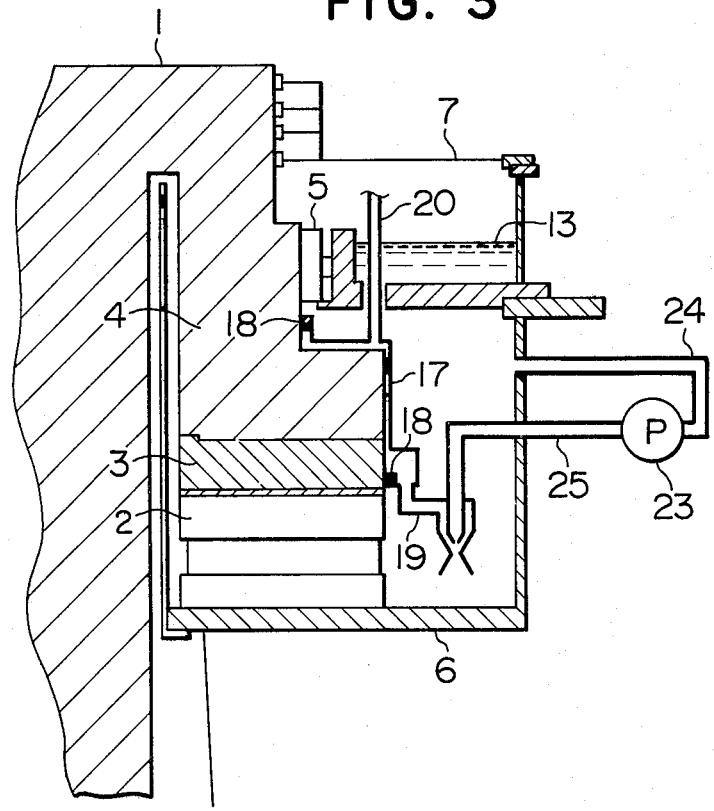
FIG. 3 is a longitudinal side elevational view of an essential part of a rotary machine equipped with a thrust bearing device of a further embodiment of the present invention; and, FIG. 4 is a plot representing the relationship between a circumferential speed of a bearing collar and friction loss in the surface of said bearing collar.

FIG. 3 shows the embodiment where a pump is separately provided for the lubricating oil discharge.

The bearing collar 4 is at surrounded its outer periphery with the oil seal cover 17 provided with oil seal means 18 for preventing ingress of the lubricating oil into the air chamber. The oil seal cover 17 is provided with the air intake port 20 in the upper end thereof, said air intake port having an opening positioned above the oil surface 13. Provided in the lower end of oil seal cover 17 is the lubricating oil discharge port 19. A pump 23 serves to draw the lubricating oil into the oil tank by way of a lubricating oil suction pipe 24 and is connected to a lubricating oil discharge pipe 25 provided on the discharge side of the pump. The lubricating oil discharge pipe 25 extends in the lubricating oil tank and has a nozzle-shaped end, which is fittedly connected with the end portion of lubricating oil discharge port 19 extending from the lower portion of oil seal cover 17.

The connection between the end portion of lubricating oil discharge pipe 25 and the pipe extending from the lubricating oil discharge port 19 is such that the latter pipe encircles the former pipe coaxially therewith, said latter pipe having a coarctate portion and a trumpet-shaped opening contiguous thereto and serving for an injection pump to draw the lubricating oil from the lubricating oil discharge port 19 in cooperation with the jet stream of oil injected from the nozzle-shaped end of discharge pipe 25.

With the provisions described, when the pump 23 is operated, the lubricating oil in the oil tank will be injected from the nozzle by way of the oil suction pipe 24, the pump 23 and the discharge pipe 25. The jet stream of lubricating oil causes discharge of the lubricating oil in the air chamber of oil seal cover 17 through the oil discharge port 19, in cooperation with the suction of the pump. With discharge of the lubricating oil from the air chamber, air is drawn through the air intake port 20 into the air chamber, whereby the outer periphery of bearing collar 4 comes to contact air, and thus loss due to agitation is reduced.

Since the injection pump is normally maintained operative, the lubricating oil introduced through the oil seal portion 18 into the air chamber will be continuously discharged therefrom, and thus the air chamber is usually maintained empty.

The injection pump has no mechanically operating portion and is simple in construction, such that the injection pump is suited for the case where the use of the oil-air mixture is imperative.

It is recommendable that the chamber defined by the oil seal cover 17 and the outer periphery of bearing collar be relatively widened in the lower portion of said oil seal cover, and the position of the lubricating oil discharge port 19 be adjacent to the bottom of the chamber. It is also preferable that the bottom of the chamber be located at a portion lower than the oil seal means 18. This facilitates dishcarge of the lubricating oil dwelling in the chamber defined by the oil seal cover and the outer periphery of the bearing collar, such that the possibility of the bearing collar 4 of contacting lubricating oil 13 will be greatly lessened.

The injection pump 23 may be exclusively and for discharging the lubricating oil from the chamber defined by the oil seal cover and the bearing collar. In most cases, the thrust bearing device is used for a power generating rotary machine of a large capacity and of high speed. Such a large scale of rotary machine is generally equipped with a pumping device of a large capacity for cooling the lubricating oil in the lubricating oil tank, such that the lubricating oil in the oil tank may drawn by the pump into the outside of the oil tank followed by the cooling, and then fed back to the lubricating oil tank.

For such an apparatus, an injection pump need not be separately provided. In such a case, the lubricating oil to be discharged by the pump used for cooling the lubricating oil in the oil tank is caused to partly flow to the piping connected to the injection pump, so as to provide a jet stream of the lubricating oil, and thus the intended result will be achieved.

In the so-called self-pumping arrangement, in which a hole is provided on the bearing collar radially thereof, whose outer periphery is encircled with a casing, and the jet stream of the lubricating oil from such a hole serves to introduce the lubricating oil in the oil tank to the outside of the cooler, the lubricating oil to be discharged partly flows to the injection pump for providing a jet stream of the lubricating oil, thereby achieving the intended result.

Attention should be paid to the position of the injection pump. In case the injection pump is located under the oil surface as shown in FIG. 3, it follows that after the discharge of the lubricating oil, air will be blown into the lubricating oil, with a risk of forming air bubbles. This will be avoided by positioning the injection pump portion above the oil surface, or otherwise by extending the piping connected to the trumpet-shaped opening so as to position said opening above the oil surface.

As is apparent from the foregoing, according to the present invention, a pump is used for forcibly discharging the lubricating oil dwelling in the air chamber defined by the oil seal cover and the outer periphery of bearing collar, and in addition, the pump used has no mechanically operating portion and is capable of pumping the lubricating oil as well as air, such that the pump will be operated with high reliability without trouble in any operational conditions of the apparatus in which the bearing device is incorporated.

Figure 4:
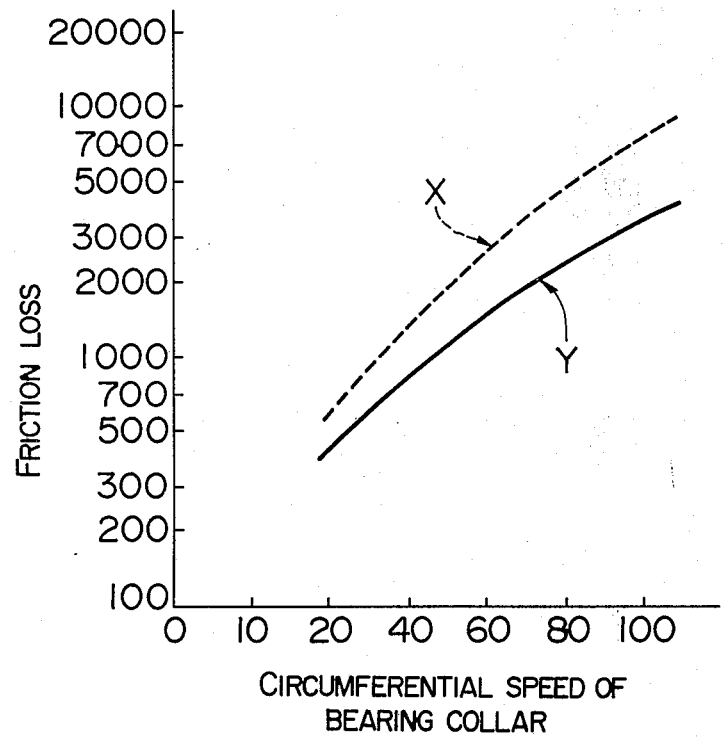

The results obtained by the thrust bearing device of the present invention will be more clearly understood from the plot of FIG. 4, which represents the relationship between the circumferential speed of a bearing collar and the friction loss in the bearing collar due to the lubricating oil, shown for comparison purpose. For testing, there was selected a bearing device commonly used for an apparatus of a large capacity, whose bearing collar was 2650 mm in outer diameter and 514 in r.p.m.

The curve X shown by a dotted line represents the results of the conventional bearing device commonly used, i.e. the bearing device having no oil seal cover. It will be obvious that friction loss rapidly increases with increase in the circumferential speed. On the other hand, the bearing device of the present invention presents good results, which are given by the curve Y shown by a solid line.

The difference in friction loss between both bearing devices is not so large at a low circumferential speed, while at the circumferential speed of more than 60 m/sec, friction loss in the bearing device of the present invention decreases to 30 % of that of the conventional bearing device. This proves the superiority of the bearing device of the present invention, and hence the device of the present invention will be efficacious when it is incorporated in a high speed machine or a large capacity machine.

According to the bearing device of the present invention, the oil seal cover is provided around the outer periphery of bearing collar, said oil seal cover being provided with the air intake port in the upper portion thereof and the lubricating oil discharge port in the lower portion thereof, and pump means is utilized to discharge the lubricating oil dwelling in the air chamber defined by the bearing collar and the oil seal cover from the discharge pipe while air is led through the air intake port ——; and change "surcase" to ——surface, such that the outer peripheral surcace of bearing collar remains out of contact with the lubricating oil, with the result of reduction to a greater extent in friction loss in the outer periphery thereof and further the lubricating oil is always clean without including air from the air chamber.

What is claimed is:

1. In a thrust bearing device, the improvements comprising:
   a circular lubricating oil tank surrounding a rotary shaft at a given spacing from said rotary shaft;
   lubricating oil filled in said lubricating oil tank;
   a thrust bearing disposed in a bottom portion of said lubricating oil tank;
   a skirt-shaped bearing collar slidingly rotating along a surface of said thrust bearing with rotation of said rotary shaft; and
   a fixed oil seal cover mounted around the outer peripheral surface of said bearing collar in spaced relation thereto, thereby defining an air chamber between said oil seal cover and the outer periphery of said bearing collar;
   said oil seal cover being provided with an air intake port for communicating said air chamber with atmosphere outside the lubricating oil and a lubricating oil discharge port having one end connected to said air chamber and the other end extending above the lubricating oil surface for discharging from said air chamber the lubricating oil dwelling therein by resorting to lubricating oil discharge means, thereby emptying said air chamber.

2. In a thrust bearing device, the improvements comprising:
   a circular lubricating oil tank surrounding a rotary shaft at a given spacing from said rotary shaft;
   lubricating oil filled in said lubricating oil tank;
   a thrust bearing disposed in a bottom portion of said lubricating oil tank;
   a skirt-shaped bearing collar slidingly rotating along a surface of said thrust bearing with rotation of said rotary shaft; and
   an oil seal cover fixedly mounted on and around the outer peripheral surface of said bearing collar in spaced relation thereto, thereby defining an air chamber between said oil seal cover and the outer periphery of said bearing collar;
   said oil seal cover being provided with an air intake port communicating said air chamber with the atmosphere outside the lubricating oil and a lubricating oil discharge port located in a portion where the lubricating oil in the air chamber receives the centrifugal force with rotation of said bearing collar and communicating directly with the atmosphere above the lubricating oil surface.

3. In a thrust bearing device, the improvements comprising:
   a circular lubricating oil tank surrounding a rotary shaft at a given spacing from said rotary shaft;
   lubricating oil filled in said lubricating oil tank;
   a thrust bearing disposed in a bottom portion of said lubricating oil tank;
   a skirt-shaped bearing collar slidingly rotating along a surface of said thrust bearing with rotation of said rotary shaft; and
   an oil seal cover fixedly mounted around the outer peripheral surface of said bearing collar in spaced relation thereto, thereby defining an air chamber between said oil seal cover and the outer periphery of said bearing collar;
   said oil seal cover being provided with an air intake port for communicating said air chamber with the atmosphere outside of the lubricating oil and a lubricating oil discharge port for discharging from said air chamber the lubricating oil dwelling therein,
   said lubricating oil discharge port having one end surrounding an oil injection nozzle coaxially therewith, said oil injection nozzle being adapted to inject the lubricating oil by means of a motive power, whereby the lubricating oil dwelling in said air chamber is discharged through the lubricating oil discharge port due to the stream of lubricating oil injected from said nozzle.

4. In a thrust bearing device as defined in claim 3, wherein oil discharged from a circulating pump for cooling the lubricating oil in the oil tank is partly fed to said nozzle for injection of oil stream.

* * * * *